Figure 1:
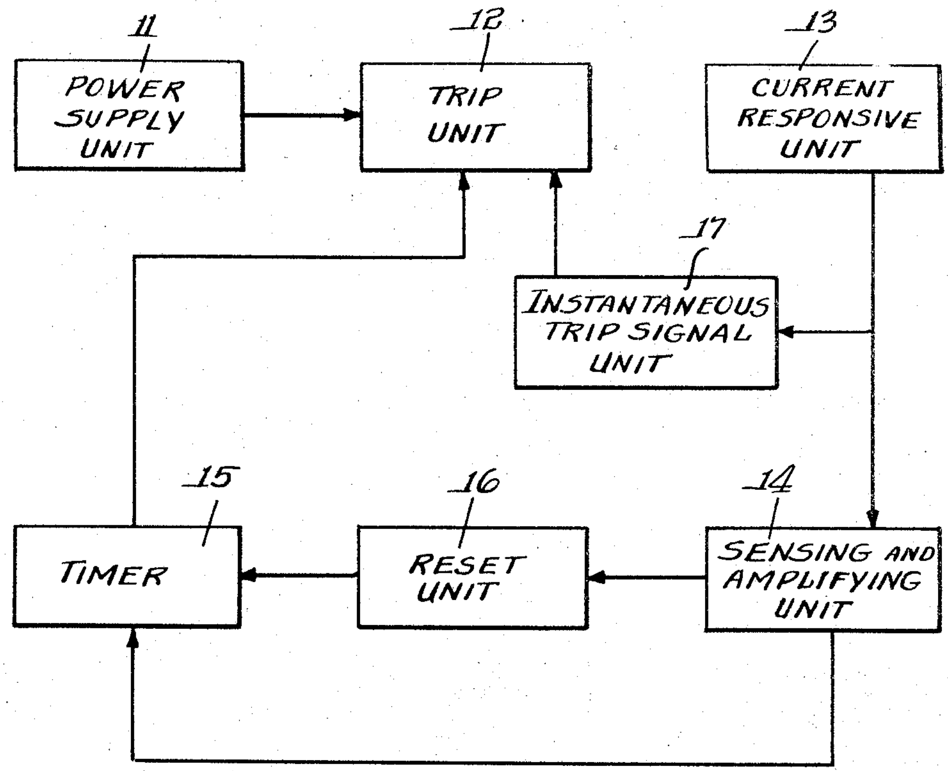

July 4, 1967 T. E. DE VINEY ETAL 3,329,870

STATIC TRIPPING DEVICE FOR AN ELECTRIC CIRCUIT BREAKER

Filed Feb. 19, 1965 2 Sheets-Sheet 1

Inventors:
Terrence E. DeViney
Lee J. Penkowski
By: Harold J. Rathbun
Atty

STATIC TRIPPING DEVICE FOR AN ELECTRIC CIRCUIT BREAKER

Filed Feb. 19, 1965 2 Sheets-Sheet 2

Inventors:
Terrence E. DeViney
Lee J. Penkowski
By: Harold J. Rathbun atty.

United States Patent Office 3,329,870
Patented July 4, 1967

3,329,870
STATIC TRIPPING DEVICE FOR AN ELECTRIC CIRCUIT BREAKER

Terrence E. De Viney, Seven Hills, and Lee J. Penkowski, Warrensville Heights, Ohio, assignors to Square D Company, Park Ridge, Ill., a corporation of Michigan Filed Feb. 19, 1965, Ser. No. 433,990
5 Claims. (Cl. 317—36)

This invention relates to a tripping device for an electric circuit breaker, and more particularly to a transistorized static tripping device operative to effect delayed opening of a circuit breaker upon the occurrence of a sustained overload or fault current of relatively low magnitude and substantially instantaneous opening of the circuit breaker upon the occurrence of an overload or fault current exceeding a predetermined value.

Because of their greater accuracy, speed of operation, absence of moving parts and ease of adjustment, static tripping devices are replacing conventional magnetic tripping devices for circuit breakers in some applications. One of the major problems in the design of a static tripping device is the provision of a means for storing sufficient tripping energy so that energy to trip the circuit breaker is always available despite substantial reductions in line voltage caused by a fault. Another problem requiring solution in the design of a static tripping device is the provision of a completely static timer which can reliably measure a relatively long time interval inversely related to the magnitude of an excessive current and which can be reset automatically in the event the excessive current decreases to a safe value before the circuit breaker trips. Both of these problems are solved by the present invention.

In a static tripping device in accordance with the present invention, power for tripping a circuit breaker is provided by a power supply unit including a capacitor for storing energy and a ferro-resonant charging circuit for the capacitor which maintains a relatively high voltage on the capacitor even though the line voltage decreases materially. A voltage signal, proportional to the magnitude of the current in the power line protected by the circuit breaker, is impressed upon both an instantaneous trip signal unit and a delayed trip signal means. The instantaneous trip signal unit provides a control signal whenever the line current exceeds a predetermined value. The delayed trip signal means includes a timer and provides a control signal after a time interval inversely related to the value of a sustained overload or fault current below said predetermined value. In event the line current decreases to a safe value before the timer completes its timing cycle, a reset unit in the delayed trip signal means operates automatically to return the timer to its initial condition. The control signals from the instantaneous trip signal unit and the delayed trip signal means are impressed selectively on a trip unit which responds thereto to effect tripping of the circuit breaker.

An object of this invention is to provide an improved static tripping device for a circuit breaker.

Another object is to provide a static tripping device having an improved means for controlling the energization of a trip coil of a circuit breaker.

Another object is to provide a static tripping device having an improved delayed trip signal means for providing an inverse time characteristic to the tripping operation of a circuit breaker.

Another object is to provide a static tripping device having an improved instantaneous trip signal unit for providing rapid response of a circuit breaker to a large overload or fault current.

Another object is to provide an improved static tripping device having means for providing an instantaneous trip signal and means for providing a delayed trip signal, both means being responsive to the voltage across a common potentiometer.

Another object is to provide a static tripping device having an improved delayed trip signal means wherein timing pulses are produced by a relaxation oscillator and counted by a saturable reactor.

Another object is to provide a static tripping device having an improved instantaneous trip signal unit wherein a tripping signal is produced upon breakdown of a Zener diode.

Figure 2:
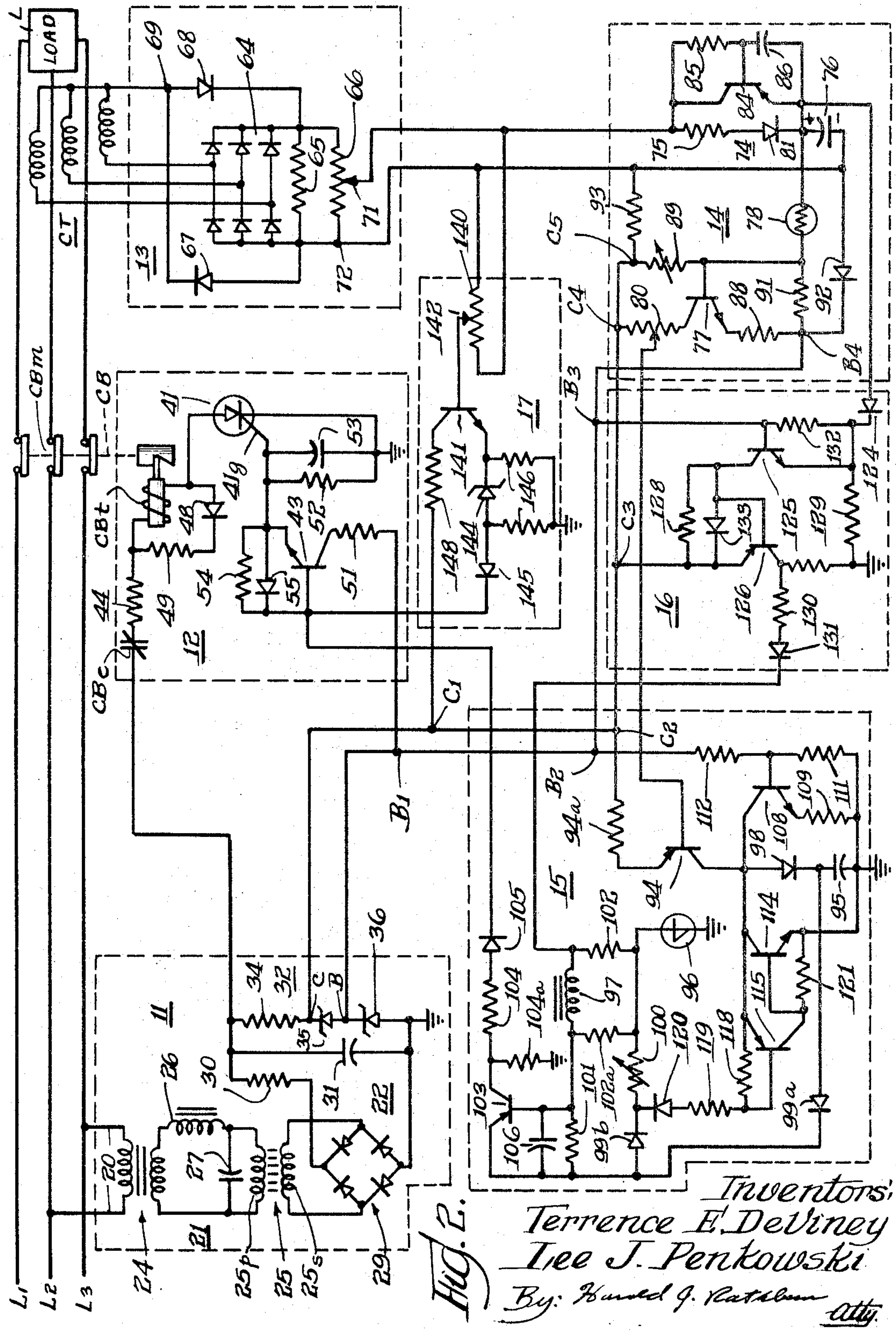

Further objects and advantages of this invention will become apparent from the following specification wherein reference is made to the drawings, in which:

FIGURE 1 is a block diagram of a static tripping device for a circuit breaker in accordance with this invention; and FIGURE 2 is a wiring diagram of the tripping device of FIGURE 1.

Referring to the block diagram of FIGURE 1, the illustrated embodiment of the invention comprises a power supply unit 11, a trip until 12, a current-responsive unit 13, a sensing and amplifying unit 14, a timer 15, a reset unit 16 and an instantaneous trip signal unit 17. The timer 15 and the units 14 and 16 constitute a delayed trip signal means. The trip unit 12 receives operating power from the power supply unit 11, delayed trip signals from the timer 15, and instantaneous trip signals from the instantaneous trip signal unit 17. The timer 15 and the reset unit 16 receive signals from the sensing and amplifying unit 14 which, in turn, receives signals from the current-responsive unit 13. The unit 13 also supplies signals to the instantaneous trip signal unit 17. The reset unit 16 provides signals to the timer 15 for resetting the timer. Although not indicated in the block diagram of FIGURE 1, the power supply 11 supplies operating power not only to the trip unit 12, but also to the timer and each of the other units of FIGURE 1 except the current-responsive unit 13.

Referring now to FIGURE 2, the tripping device is shown as arranged to be responsive to the current in a polyphase power line, comprising conductors L1, L2, and L3, to effect tripping of a circuit breaker CB controlling a load L supplied through the power line.

The power supply unit 11 of the tripping device receives its input power through a pair of conductors 20 from the supply lines L2 and L3 on the source side of main contacts CB*m* of the circuit breaker CB, and comprises a ferro-resonant circuit portion 21 and an energy storage portion 22. The ferro-resonant circuit portion 21 comprises a step-down transformer 24 having its primary winding supplied through the conductors 20 and its secondary winding connected in a loop circuit with a primary winding 25*p* of a saturable transformer 25 through a reactor 26, a capacitor 27 being connected in parallel with the primary winding 25*p*. The core of the transformer 25 has a substantially rectangular hysteresis loop. Reference may be had to vol. 73, pages 352–358, and vol. 75, pages 296–307, of AIEE Transactions for a detailed explanation of the ferro-resonant circuit portion 21. The output voltage of the ferro-resonant circuit portion 21 appears at a secondary winding 25*s* of the transformer 25 as a square wave of substantially constant magnitude even upon a material decrease in the voltage at the supply conductors L2 and L3 caused by a fault. For example, the voltage at the supply conductors L2 and L3 can drop to one-fourth of rated value in event of a fault with no material change in the output voltage of the ferro-resonant circuit 21 at the secondary winding 25*s*.

The energy storage portion 22 of the power supply unit comprises a full-wave rectifier bridge 29 having its A-C input terminals connecter across the secondary winding 25*s* and its D-C output terminals connected in a loop circuit through a resistor 30 and a capacitor 31. The capacitor 31 is of relatively large capacitance and provides a reservoir of stored energy adequate for rendering the trip unit 12 operative in the absence of material voltage at the conductors L2 and L3. A voltage divider 32, comprising a resistor 34 and a pair of Zener diodes 35 and 36, is connected across the capacitor 31. The full voltage across the capacitor 31 supplies tripping power for the circuit breaker CB. Control power for the trip unit 12, the timer 15, and the units 14, 16, and 17 is taken at lower voltages from a junction B between the diodes 35 and 36 and from a junction C between the diode 35 and the resistor 34, the negative terminal of the voltage divider 32 being grounded as indicated.

The trip unit 12 comprises a controlled rectifier 41, such as a silicon-controlled rectifier having a gate 41*g*, and a switching transistor 43 arranged to control the gate 41*g*. The controlled rectifier 41 is connected in series with a trip coil CB*t* of the circuit breaker CB, a resistor 44, and a set of normally-closed auxiliary contacts CB*c* of the circuit breaker CB across the full extent of the voltage divider 32. A diode 48 and a resistor 49 are connected in series with each other across the coil CB*t* to provide a path for the inductive discharge of the coil CB*t*.

A control signal in the form of a triggering pulse received at the base of the transistor 43 from either the timer 15 or from the instantaneous trip signal unit 17 causes the transistor 43 to conduct thereby to impress a firing voltage on the gate 41*g* of the controlled rectifier 41. Firing of the rectifier 41 effects energization of the trip coil CB*t* and the opening of the main contacts CB*m* of the circuit breaker CB which are interposed respectively in the supply conductors L1, L2, and L3. The contacts CB*c* then open to deenergize the coil CB*t*. The circuit breaker CB is reclosed by conventional means not shown.

The collector-emitter circuit of the transistor 43 is connected between the junction B of the voltage divider 32 and ground through a junction B1 and a pair of resistors 51 and 52, a capacitor 53 being connected in parallel with the resistor 52. The gate 41*g* and the cathode of the rectifier 41 are connected across the resistor 52. A resistor 54 and a diode 55 are connected in parallel with each other between the emitter and base of the transistor 43. The resistor 54 provides a by-pass circuit for reverse bias collector current, and the diode 55 compensates for thermally caused variations in the reverse bias collector current.

The current-responsive unit 13 may be of any type capable of providing a unidirectional output voltage proportional to the magnitude of the alternating current flowing to the load L through the conductors L1, L2, and L3. As shown, the current-responsive unit 13 comprises three current transformers CT connected in a Y configuration to a three-phase rectifier bridge 64 loaded by a resistor 65 of relatively low resistance in parallel with a resistor 66 of relatively large resistance, the resistor 66 serving as a voltage divider. A pair of diodes 67 and 68 are interposed respectively in shunt circuits from oppoiste ends of the resistor 65 to a neutral point 69 of the Y-connected current transformer CT. Under balanced conditions in the supply lines L1, L2, and L3, no current flows in the diodes 67 and 68. However, upon the occurrence of an unbalanced fault, unbalanced currents in the rectifier bridge 64 flow through one or the other of the diodes 67 and 68 and in the resistors 65 and 66, whereby a voltage proportional to the magnitude of the fault current appears across the resistor 66.

An adjustable tap 71 on the resistor 66 provides a means to calibrate the tripping device for operation at different values of overload or fault current in the conductors L1, L2, and L3. As will be explained, the sensing and amplifying unit 14 and the reset unit 16 are responsive to the voltage across the resistor 66 between a terminal 72 and the tap 71. When the tap 71 is remote from the terminal 72, relatively small overload or fault currents initiate response of the units 14 and 17, whereas, when the tap 71 is close to the terminal 72, relatively large overload or fault currents must occur before such initiation.

The sensing and amplifying unit 14 includes an RC circuit 74 formed by a resistor 75 and a capacitor 76 connected in series with each other between the tap 71 and the terminal 72. The voltage between the terminal 72 and the tap 71 charges the capacitor 76. The voltage signal thus produced at the capacitor 76 is impressed on the base of a transistor 77 through a varistor 78. The varistor 78 is selected so that an amplified signal appearing across a load resistor 80 in the collector circuit of the transistor 77 varies as the square of the voltage across the capacitor 76, as will be explained. The RC circuit 74 further includes a diode 81 interposed in series between the resistor 75 and the capacitor 76 to prevent the capacitor 76 from discharging through the resistors 65 and 66.

The voltage across the capacitor 76 increases with increase in line current. When this voltage reaches a predetermined value indicative of an overload or fault current, a delayed tripping operation of the circuit breaker CB is initiated as will be described. If the line current decreases to a safe value before the delayed tripping operation is completed, the charge on the capacitor 76 decreases to prevent unnecessary tripping of the circuit breaker CB. This is accomplished by a transistor 84 having its collector-emitter circuit by-passing the resistor 75 and the diode 81 and having its base connected intermediate of a resistor 85 and a capacitor 86 which are connected in series across its emitter and collector terminals. The capacitor 86 provides a short delay before the initiation of this discharge path by delaying the impression of sufficient voltage on the base of the transistor 84 to cause its conduction.

The resistor 80 is interposed in a circuit extending from the terminal C of the voltage divider 32 through a plurality of junctions C1, C2, C3, and C4 to the collector of the transistor 77, and a resistor 88 is interposed in a circuit from the less positive terminal B of the voltage divider 32 through the junction B1 and a plurality of junctions B2, B3, and B4 to the emitter of the transistor 77. Bias is provided on the base of the transistor 77 through a pair of resistors 89 and 91 connected in series with C5 being connected to the junction C4. The base of the transistor 77 is connected between the resistors 89 and 91.

The non-linear characteristic of the varistor 78 is such that its resistance decreases as the square of the voltage across it. Thus, the amplified signal appearing at the resistor 80 varies as the square of the voltage across the capacitor 76.

For temperature compensation of the transistor 77, a diode 92 and a resistor 93 are connected between the negative terminal of the capacitor 76 and the junctions B4 and C5, respectively.

The timer 15 comprises a saturable timing reactor 97 and a relaxation oscillator which is formed by a transistor 94, a capacitor 95, and a Shockley diode 96. A diode 98 is interposed between the transistor 94 and the capacitor 95. The signal appearing across the resistor 80 in the sensing and amplifying unit 14 is applied to the base of the transistor 94. The emitter of the transistor 94 is connected to the junction C2 through a resistor 94*a*. Because the transistor 94 controls the charging rate of the capacitor 95, the charging rate is thus related to the magnitude of the signal at the resistor 80.

When the voltage on the capacitor 95 reaches the firing voltage of the Shockley diode 96, the diode 96 fires to discharge the capacitor 95 through a pair of diodes 99*a* and 99*b* and an adjustable resistor 100 of relatively low resistance, and through a parallel discharge path of relatively high impedance including a resistor 101, the reactor 97, and a resistor 102. A small increase in the flux in the core of the reactor 97 results from each pulse that occurs upon firing of the diode 96. When a predetermined number of pulses has occurred, the core of the reactor 97 saturates and the impedance of the reactor 97 decreases substantially to zero so that, upon the next pulse flowing through the resistor 101, the reactor 97 and the resistor 102, a materially increased voltage drop appears across the resistor 101. The increased voltage drop across the resistor 101 is applied to the base of a transistor 103 and results in the conduction of the transistor 103 and the application of a control signal through a collector load resistor 104 and a diode 105 to the base of the switching transistor 43 in the trip unit 12. The resistor 104 is part of a current divider including a resistor 104*a*. A capacitor 106 is connected across the resistor 101 to suppress transients and to provide sufficient filtering action for the pulses from the capacitor 95. Adjustment of the resistor 100 controls the pulse width of the signal through the diode 96 and thus provides for adjustment of the timing interval provided by the timer 15.

Compensation for leakage of the transistor 94 is provided by a transistor 108 having its emitter-collector circuit connected across the series-connected capacitor 95 and diode 98. A resistor 109 is connected between the emitter of the transistor 108 and ground and a resistor 111 is connected between the base and ground. A resistor 112 having a negative temperature coefficient of resistance is connected between the base of the transistor 108 and the tap B in the voltage divider 32 through the junctions B2 and B1. Thus the current by-passed by the transistor 108 varies with respect to temperature as determined by the characteristics of the resistor 112.

The pulse rate of the relaxation oscillator comprising the transistor 94, the capacitor 95, and the Shockley diode 96 is extended by a circuit comprising a pair of transistors 114 and 115. Without the transistors 114 and 115, the pulse rate of the relaxation oscillator is limited. This is because a charging current for the capacitor 95 above the holding current of the Shockley diode 96 would cause the relaxation oscillator to stop pulsing by preventing the Shockley diode 96 from returning to its blocking state. The circuitry including the transistors 114 and 115 provides a by-pass circuit for the capacitor 95 during the interval of firing of the Shockley diode 96. This permits the charging current of the capacitor 95 to be increased far beyond the holding value of the Shockley diode 96, thereby increasing the frequency of the pulses so as to obtain a wider and more desirable range of timing.

More specifically, when the voltage on the capacitor 95 reaches a predetermined value, the Shockley diode 96 fires. At the same time, a current flows through a pair of resistors 118 and 119 and a diode 120 thereby impressing a negative bias on the base of the transistor 115 rendering it conductive. The base of the transistor 114 and the collector of the transistor 115 are interconnected with each other and through a common resistor 121 to ground. Thus, the conduction of the transistor 115 provides a positive bias on the base of the transistor 114 to render the latter conductive, thereby effectively grounding the collector of the transistor 94 through a circuit bypassing the diode 98 and the capacitor 95. With the bypass circuit conductive, the diode 96 can cease conduction and recover to its blocking state even through the transistor 94 is still conducting a current higher than the holding current of the diode 96.

The reset unit 16 is a switching device comprising a diode 124, and a pair of transistors 125 and 126. With no input signal received through the diode 124, the transistor 125 is biased on by the voltage from the junction B3 resulting in flow of current from the junction C3 through a resistor 128, the collector-emitter circuit of the transistor 125, and a resistor 129 to ground. This provides a bias at the base of the transistor 126 which turns it on. The voltage at the junction C3 is then applied, through the transistor 126, a resistor 130, and a diode 131 to a junction between the reactor 97 and the resistor 102, and thence through the reactor 97 and a resistor 102*a*. This causes firing of the Shockley diode 96 and the resultant voltage drop across the resistor 102 provides a reset voltage for the reactor 97. When the voltage increases at the capacitor 76 in the sensing and amplifying unit 14 indicative of an overload or fault, current flows through the diode 124 and the resistor 132 to back-bias the transistor 125, thereby switching both of the transistors 125 and 126 off. This removes the resetting voltage across the resistor 102 for the reactor 97 and allows the timer 15 to initiate a timing function. The resetting unit 16 thus provides, because of the voltage response characteristic of the diode 124, a sharp transition between normal current conditions and overload or fault current conditions. If desired, a plurality of diodes 124 may be connected in series to provide a desired voltage response level. Further, a diode 133 may be inserted in the reset unit 16 to provide thermal stabilization.

The instantaneous trip signal unit 17 responds to provide a control signal when an overload or fault current is of such magnitude that the circuit breaker CB should be tripped instantaneously. To this end, the unit 17 provides a by-pass for the delayed trip signal means and controls the trip unit 12. The unit 17 comprises a potentiometer 140, a transistor 141 having its base connected to an intermediate adjustable tap 142 on the potentiometer 140, and a Zener diode 144. The incoming signal is taken from the tap 71 and the terminal 72 of the resistor 66 and is fed across the potentiometer 140 and thence from the tap 142 to the base of the transistor 141. When the voltage at the emitter of the transistor 141 reaches the breakdown voltage of the Zener diode 144, a control signal is applied therethrough to the switching transistor 43 in the trip unit 12 through a blocking diode 145 to render the transistor 43 conductive whereby the rectifier 41 fires, in the manner previously described, to trip the circuit breaker CB. The Zener diode 144 blocks all voltage signals below a value indicating an overload or fault current of a magnitude requiring instantaneous tripping. Opposite terminals of the Zener diode 144 are connected to ground through a pair of resistor 146. A resistor 148 serves as a collector load for the transistor 141.

In operation, when an overload or fault occurs in any of the power lines L1, L2, or L3, an increased voltage signal appears across the potentiometer 66 from the bridge circuit 64 connected to the current transformer CT. This signal is applied to both the potentiometer 140 and the capictor 76. If the increase in the load current results from an excessive overload or a low impedance fault, the voltage signal appearing at the potentiometer 140 is sufficient to break down the Zener diode 144 thereby causing the transistor 141 to conduct in the manner previously described and causing the switching transistor 43 to conduct and fire the silicon-controlled rectifier 41. Conduction of the rectifier 41 permits the capacitor 31 to discharge to ground through the coil CB*t* of the circuit breaker CB causing opening of the contacts CB*m*.

If the voltage signal appearing at the potentiometer 66 upon an overload or fault is insufficient to break down the Zener diode 144 and activate the instantaneous trip unit 17, the charge on the capacitor 76 increases, and since it is applied to the base of the transistor 77 through the varistor 78, produces an amplified signal across the resistor 80 proportional to the square of the voltage at the resistor 66. A portion of the amplified signal is applied to the base of the transistor 94 in the timer 15. At the same time, the voltage on the capacitor 76 is applied through the diode 124 to switch off the transistors 125 and 126 thereby to permit the timer 15 to start timing. Conduction of the transistor 94 charges the capacitor 95 which applies a voltage to the Shockley diode 96 through the diodes 99a and 99b and the resistor 100. When this voltage reaches a predetermined level, the diode 96 fires. As previously mentioned, a parallel path to the diode 96 includes the resistor 101, the reactor 97, and the resistor 102. Each time the diode 96 conducts, the flux in the core of the reactor 97 increases toward saturation in discrete steps. When a predetermined number of pulses has occurred, the core of the reactor 97 saturates and the impedance of the reactor 97 is materially reduced. The next pulse resulting from the firing of the Shockley diode 96 causes a relatively large voltage drop across the resistor 101 which is applied to the base of the transistor 103 causing its conduction and a control signal to be applied through the resistor 104 and diode 105 to the base of the switching transistor 43 in the trip unit 12. The transistor 43 conducts to fire the rectifier 41 and the capacitor 31 discharges through the coil CB*t* to ground, thereby tripping the circuit breaker CB. As previously mentioned, if the overload or fault is not sustained for a sufficient length of time for the core of the reactor 97 to saturate, the transistor 84, after a short delay, conducts to reduce the charge on the capacitor 76 and the reset unit 16 operates to reset the timer 15.

What is claimed is:

1. A static tripping device for a circuit breaker having contacts interposed in a power line and having a tripping means operative to open said contacts, said tripping device comprising means for producing a control voltage which varies directly with the magnitude of the current in the power line, means impressing said control voltage upon first and second circuit means, said first circuit means being responsive to the impression of said control voltage thereon to produce a first control signal in response to said control voltage increasing above a first predetermined magnitude, said second circuit means being responsive to the impression of said control voltage thereon to produce a second control signal in response to said control voltage increasing above a second predetermined magnitude greater than said first predetermined magnitude, and a switching means rendered operative upon application of either of said control signals thereto to render the tripping means operative thereby to open the contacts of the circuit breaker, means applying said first and second control signals to said switching means upon their respective production by said first and second circuit means, said first circuit means including a timing means to delay production of said first control signal for a period of time after said control voltage increases above said first predetermined magnitude, said period of time being inversely related to the magnitude of said control voltage during said period, said timing means including a relaxation oscillator and a saturable reactor, said relaxation oscillator being operative to supply discrete voltage pulses to said reactor during operation of said timing means, said reactor exhibiting a substantial reduction in impedance upon reaching saturation after a predetermined number of said pulses have been applied, said timing means further including means responsive to said reduction in impedance to produce said first control signal, and said second circuit means being operative to produce said second control signal substantially instantaneously upon said control voltage increasing above said second predetermined magnitude.

2. A static tripping device for a circuit breaker having contacts interposed in a power line and having a tripping means operative to open said contacts, said tripping device comprising means for producing a control voltage which varies directly with the magnitude of the current in the power line; means impressing said control voltage upon first and second circuit means; said first circuit means being responsive to the impression of said control voltage thereon to produce a first control signal in response to said control voltage increasing above a first predetermined magnitude; said second circuit means being responsive to the impression of said control voltage thereon to produce a second control signal in response to said control voltage increasing above a second predetermined magnitude greater than said first predetermined magnitude; a switching means rendered operative upon application of either of said control signals thereto to render the tripping means operative thereby to open the contacts of the circuit breaker; and means applying said first and second control signals to said switching means upon their respective production by said first and second circuit means; said first circuit means including a timing means to delay production of said first control signal for a period of time after said control voltage increases above said first predetermined magnitude, a capacitor connected to receive a charge directly related in magnitude to said control voltage, and means for applying a timing voltage to said timing means directly related to the square of the voltage of the charge on said capacitor, said timing means being responsive to said timing voltage to produce said first control signal after a period of time inversely related to the magnitude of the timing voltage and, consequently, after a period of time inversely related to the magnitude of said control voltage during said period; said second circuit means being operative to produce said second control signal substantially instantaneously upon said control voltage increasing above said second predetermined magnitude.

3. A tripping device in accordance with claim 2 characterized in that said first circuit means include means for resetting said timing means and discharging said capacitor upon said control voltage falling below said first predetermined magnitude before said timing means produces said first control signal.

4. A static tripping device for a circuit breaker having contacts interposed in a power supply line and having a tripping means operative to open said contacts, a trip unit for rendering said tripping means operative upon reception thereby of a control signal, a power supply unit arranged to receive power from the power supply line and operable to store said power and to supply it to said trip unit independently of the voltage at the power supply line, a current-responsive unit for producing a control voltage which varies directly with the current in the power supply line, an instantaneous trip signal unit, a delayed trip signal means including a sensing and amplifying unit, a timer and a reset unit, said sensing and amplifying unit being connected to said current-responsive unit and operable to supply a timing voltage to said timer upon the current in the power line exceeding a first predetermined value, said timer being responsive upon receipt of said timing voltage to start a timing period and being operative to provide a control signal to said trip unit upon expiration of said timing period, said reset unit being operative to reset said timer to its initial condition if the current in said power line decreases below said first predetermined value during said timing period, and said instantaneous trip unit being connected to said current-responsive unit and operative to provide a control signal to said trip unit upon the current in said power supply line exceeding a second predetermined value greater than said first predetermined value.

5. A static tripping device for a circuit breaker having contacts interposed in a power line and having a tripping means operative to open said contacts, said tripping device including a current-sensing means for producing a control voltage which varies directly with the magnitude of the current in the power line, said current-sensing means comprising a polyphase current transformer connected in a Y configuration and responsive to the current in the power line, a polyphase rectifier supplied from said current transformer, a potentiometer connected across the output of said polyphase rectifier, and a pair of diodes connected in reverse relationship to each other between opposite ends of said potentiometer and the neutral point of the Y-connected current transformer, whereby the voltage across the potentiometer is directly related to the magnitude of both balanced and unbalanced currents in the power line, and said tripping device further including means responsive to the voltage across the potentiometer for rendering the tripping means of the circuit breaker operative.

References Cited

UNITED STATES PATENTS

| | | | |
|---|---|---|---|
| 2,343,423 | 3/1944 | Reagan | 317—27 X |
| 3,132,287 | 5/1964 | Yarbough | 317—36 X |
| 3,262,017 | 7/1966 | Ashenden et al. | 317—36 X |

MILTON O. HIRSHFIELD, *Primary Examiner.*

J. D. TRAMMELL, *Assistant Examiner.*